July 23, 1968  F. G. BROWN  3,394,259
HOLLOW CONICALLY SHAPED INFRARED REFERENCE SOURCE FORMED
FROM BARE AND INSULATED HELICALLY WOUND WIRES
Filed Feb. 2, 1966

INVENTOR.
FLOYD GERALD BROWN
BY
ATTORNEY.

United States Patent Office 3,394,259
Patented July 23, 1968

3,394,259
HOLLOW CONICALLY SHAPED INFRARED REFERENCE SOURCE FORMED FROM BARE AND INSULATED HELICALLY WOUND WIRES
Floyd G. Brown, San Diego, Calif., assignor, by mesne assignments, to the United States of America as represented by the Secretary of the Navy
Filed Feb. 2, 1966, Ser. No. 524,977
8 Claims. (Cl. 250—85)

ABSTRACT OF THE DISCLOSURE

The description discloses an infrared reference source which includes a bare-conductive wire and a thinly insulated conductive wire alternately wound in engaging helical turns of progressively increasing diameter to form a hollow conical body which has an interior surface which is capable of radiating infrared. The bare and insulated wires have substantially the same thermal conductivity so that the interior surface of the wire wound body has thermal continuity and is highly responsive to temperature changes. When the wires are of a particular size this responsiveness is enhanced. A regulator, which may include a thermistor disposed within the hollow body, may be employed to control current within the bare wire and thus the temperature of the conical body.

---

The present invention relates to an infrared reference source and more particularly, to such a source which has a very low thermal lag when temperature adjustments are made.

Infrared measuring instruments necessarily require an infrared reference source for the purpose of making a comparison between the reference and the infrared radiation which is to be measured. By calibration the temperature of the emitting body can be determined. In order for the infrared instrument to be accurate in its measurement it is essential that the reference source be held at a constant temperature even though the ambient temperature varies to some degree. Accordingly, when there is a change in the ambient temperature it is important that the infrared reference source be capable of responding instantaneously to maintain its temperature at the desired constant level.

Prior art infrared reference sources have been difficult to maintain at a constant temperature because of their high thermal lag in returning to the constant temperature when there is a variation in the ambient temperature. This is especially so when the infrared reference source is to operate at or near ambient temperature. This thermal lag is due to the relatively large amount of mass of the emitting surface. A lengthy period of time is required to bring this mass back to the constant temperature when there is a variation in the ambient temperature. It is this unduly long thermal lag of the present art infrared references sources that the present invention overcomes.

The present invention provides an infrared reference source which has a very low thermal lag so that it will return instantaneously to the desired constant temperature when there is a change in ambient temperature. This has been accomplished by an arrangement which minimizes the mass of the emitting surface. The present invention utilizes a conductive wire which is wound to form a hollow body having an interior surface which is capable of radiating infrared. The wire itself constitutes the infrared emitting surface rather than a mass heated by the wire as found in the prior art. The wire wound body is open at one end and is substantially clear of any foreign objects within its interior so that there is no interference with the wire functioning as the emitting surface. In order to insulate the windings of the conductive wire from one another an insulated wire may be alternately wound therebetween. It is desirable that the insulated wire have substantially the same thermal conductive properties as the conductive wire so that there is thermal continuity along the interior surface of the wire wound body.

The present invention enables a very simple method of manufacture. The wire wound body may be conical and may be formed in such shape by winding the wire on a conical mandrel. Thereafter, epoxy may be bonded to the exterior of the wire wound body so as to retain the body in the desired configuration. The mandrel is then removed leaving the interior surface of the wire wound body free from epoxy and capable of acting as the infrared emitting surface.

An object of the present invention is to provide an infrared reference source which has a very low thermal lag in returning to a desired constant temperature when there is a variation in ambient temperature;

Another object is to provide an infrared reference source which is capable of remaining more exactly at a desired constant temperature than prior art infrared reference sources when there is a change in ambient temperature;

A further object is to provide an infrared reference source in which the mass of the infrared emitting body is at a minimum;

Still another object of the present invention is to provide an infrared reference source which is easy to manufacture and low in cost;

Yet another object of the present invention is to provide a method of manufacture of an infrared reference source, which is simpler and lower in cost than prior art manufacturing methods; and Other objects, advantages and novel features of the invention will become apparent from the following detailed description of the invention when considered in conjunction with the accompanying drawing wherein.

Figure 1:
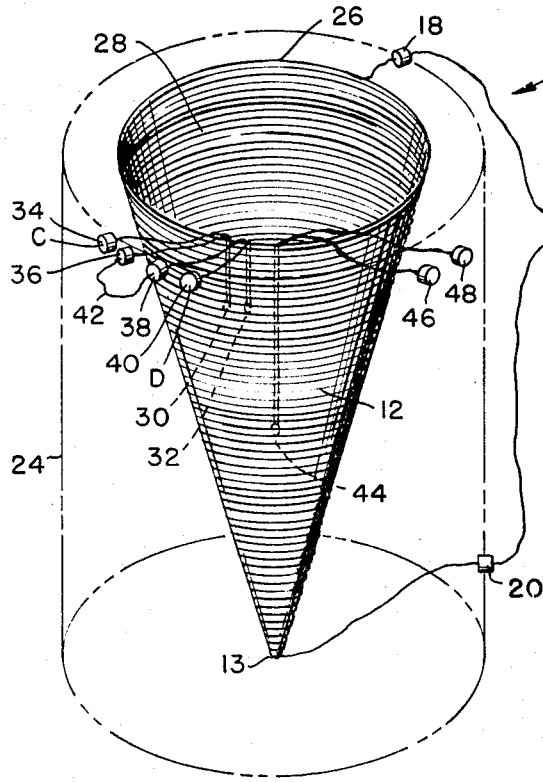
FIG. 1 is an isometric view of the wire wound body with the bonded epoxy shown in phantom and a schematic view of the regulator for controlling the temperature of the wire wound body.
Figure 2:
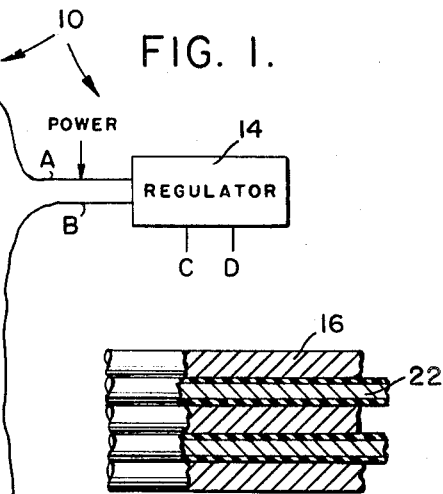
FIG. 2 is an enlarged partial side view of the wound wires of FIG. 1 with portions of the wires shown in longitudinal cross section.

Referring now to the drawing wherein like reference numerals designate like or similar parts throughout the several views, there is shown in FIG. 1 the infrared reference source 10 which includes a wire wound hollow body 12 and which further may include a regulator 14 for controlling the temperature of the body 12. For ease of manufacturing, which will be explained in more detail hereinafter, the body 12 may be conical shaped, as shown in FIG. 1. The wire wound body 12 is constructed of an electrical conducting bare wire 16 which is helically wound in turns of progressively increasing diameter from an apex 13 to form the conical configuration. The conductive wire 16 ends in top and bottom terminal ends 18 and 20 and may be made of Nichrome. The conductive wire 16 is not jacketed with an insulative covering and therefore must be somehow insulated between the wire turns to prevent a shorting thereof. This may be accomplished by alternately winding a thinly insulated conductive wire 22 between the windings of the bare conductive wire 16, as shown in FIG. 2. It is desirable that the insulated wire 22 have approximately the same thermal bare property as the conductive wire 16.

This may be accomplished by using Nichrome for the wire 16 and copper for the wire 22, the wire 22 being coated with a thin film of enamel to provide the desired insulation. By utilizing wires 16 and 22 of substantially the same thermal conductivity a substantially uniform temperature can be maintained across the wires.

When the wire wound body 12 is to operate at or near ambient temperature it is important that the wires 16 and 22 be of a proper size. If the wires are too small the resistance will be high and will require a large voltage to make any temperature changes to the body 12. On the other hand if the wires are too large the mass will cause a thermal lag which reduces the responsiveness of the body 12. I have found that when the wires 16 and 22 are in the range between a number 32 wire and a number 26 wire that the body 12 will operate satisfactorily for providing a temperature at or near ambient.

Depending upon the size of the wires 16 and 22 it may be desirable to utilize a means for retaining the wires in the desired configuration. As shown in FIG. 1, the retaining means for the wires 16 and 22 may be epoxy 24 which is bonded to the exterior of the wire wound body 12 so as to secure the wires 16 and 22 in place. The epoxy 24 may be formed in a cylindrical shape, as shown in FIG. 1, with the terminal ends 18 and 20 of the conductive wire 16 bonded in the exterior surface of the epoxy cylinder. When the wire wound body 12 is to operate at or near ambient temperature it may be desirable to utilize only a thin covering of the epoxy to bond the wires 16 and 22 in place.

It is important to note that the wire wound conical body 12 is open at its base end 26 and is substantially clear of any foreign objects within its interior so that the conductive wire 16 itself in conjunction with the insulated wire 22 constitute an infrared emitting surface 28. By this arrangement the mass is kept at a minimum so that temperature changes can be made very quickly to maintain the desired constant temperature. It is desirable that the wire wound body 12 have an emissivity as close to unity as possible. This may be accomplished by covering the emitting surface 28 of the body 12 with a flat black paint.

The wire wound body 12 may be maintained at a desired constant temperature by the regulator 14 which is connected to terminal ends 18 and 20 by leads A and B. The regulator 14 controls the current within the conductive wire 16 to make the temperature adjustments. The regulator, which is shown in more detail in FIG. 3, may include a pair of thermistors 30 and 32. As shown in FIG. 1, the thermistors 30 and 32 may be draped by thermistor leads within the interior of the wire wound body 12 adjacent the emitting surface 28 so that they are capable of sensing the temperature of such surface. The thermistor leads may terminate in terminals 34, 36, 38 and 40 which may be bonded in the surface of the epoxy cylinder the same as terminals 18 and 20. The thermistors 30 and 32 are electrically connected together by a lead 42 between the terminals 36 and 38 and these thermistors may be electrically connected to the remainder of the regulator circuitry by leads C and D. Another thermistor 44 having terminal ends 46 and 48 may be utilized with a temperature indicator (not shown) for visually indicating the temperature of the wire wound body 12. The thermistor 44 is not part of the regulator 14.

Figure 3:
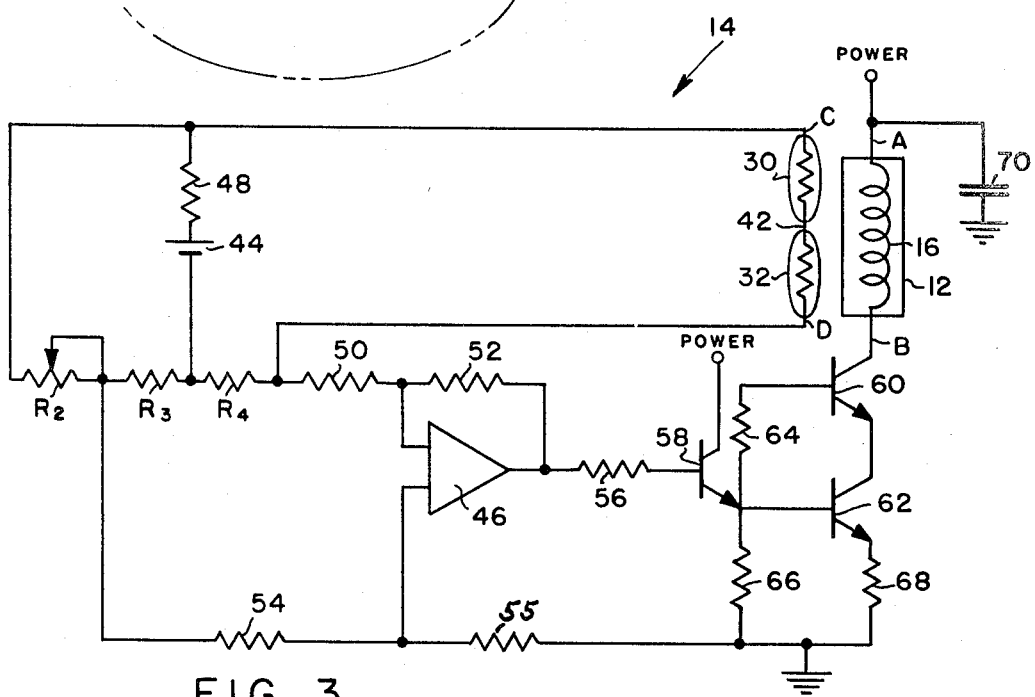
FIG. 3 is a schematic illustration of circuitry for the regulator of FIG. 1.

The conductive wire 16 of the wire wound body 12 is illustrated schematically in FIG. 3 and it is the current through this wire that the regulator 14 will control to maintain the wire wound body 12 at a constant temperature. This is accomplished by connecting the thermistors 30 and 32 into a bridge circuit with resistors $R_2$, $R_3$ and $R_4$. Connected across a pair of the bridge circuit legs is a DC power source 44 and connected across an opposite branch of the bridge circuit is a differential amplifier 46 for amplifying the output of the bridge circuit. A resistor 48 may be connected in series with the DC power source 44 so as to limit the current within the bridge circuit to a desired level. Resistor $R_2$ may be adjustable, as shown in FIG. 3, so that the bridge circuit may be set to regulate the temperature of the wire wound body 12 at the desired level.

After adjustment of the bridge circuit by resistor $R_2$ any change in temperature of the wire wound body 12 will be sensed by the thermistors 30 and 32, thereby causing an imbalance in the bridge circuit and an output to the differential amplifier 46. The gain of the differential amplifier 46 is set by resistors 50, 52, 54 and 55, and overloading of the amplifier is prevented by resistor 56. The differential amplifier 46 is provided with a power source (not shown). The output of the differential amplifier 46 is connected to an emitter follower transistor 58 which in turn has its output connected to a pair of power transistors 60 and 62. The emitter follower transistor 58 and a resistor 66 match the impedance between the differential amplifier 46 and the power transistors 60 and 62. A resistor 64 may be connected to the base of transistor 60 for balancing purposes and a limiting resistor 68 may connect the transistor 62 to ground.

The input of the transistor 60 is connected by the lead 13 to the terminal end 20 of the conductive wire 16 and the other terminal end 18 of the conductive wire is connected to a power source so that when the power transistors 60 and 62 are rendered conductive by an output from the differential amplifier 46 current will flow through the conductive wire 16 to ground. Accordingly, when the thermistors 30 and 32 sense a temperature lower than the level set by the adjustable resistor $R_2$ current will flow through the conductive wire 16 to quickly bring the temperature back to the desired level. If desired, the lead A may be connected to ground by capacitor 70 for filtering out any AC signals which may be generated within the regulator circuitry.

The present invention lends itself to a very easy method of manufacture of the wire wound body 12 along with its wire retention means. If the wire wound body 12 is conically shaped, as shown in FIG. 1, a conical mandrel can be employed to wind the wires 16 and 22 on. The epoxy 24, or any other suitable bonding substance, is then applied to the exterior body of the wires 16 and 22 to bond them in the conical configuration. After the epoxy has set the mandrel is removed and the wire wound body 12 is ready for operation. The epoxy may be applied by brushing or spraying. Alternatively the epoxy may be disposed in a cylindrical container in which case the exterior of the wire wound body 12, with the mandrel in place, is inserted with its apex downwardly into the epoxy filled container until the base end 26 is flush with the top surface of the epoxy. The terminal end of the conductive wire 16 and the terminal ends of the thermistors 30, 32 and 44 may be suitably placed so that the epoxy will bond them in a desired position.

It is now readily apparent that the present invention provides an infrared reference source which has a minimal thermal lag, thereby enabling the reference source to be maintained very close to a desired constant temperature. When there is a fluctuation in ambient temperature so as to cause a change in temperature of the wire wound body 12 this change is quickly sensed and because of the slight mass of the wire wound body 12 its temperature can be quickly brought back to the desired level.

Obviously many modifications and variations of the present invention are possible in the light of the above teachings. It is therefore to be understood that within the scope of the appended claims the invention may be practiced otherwise than as specifically described.

I claim:
1. An infrared reference source comprising:
   a bare conductive wire and a thinly insulated conductive wire alternately wound in engaging helical turns of progressively increasing diameter to form a hollow conical body which has an interior surface which is capable of radiating infrared;

the wire wound body being open at its base end and substantially clear of any foreign objects within its interior so that the wire itself constitutes the infrared emitting surface; and the bare and insulated wires having substantially the same thermal conductivity so that the interior surface of the wire wound body has thermal continuity.

2. An infrared reference source as claimed in claim 1 wherein:

the bare wire is Nichrome and the insulated wire is copper which is covered with a thin film of enamel.

3. An infrared reference source as claimed in claim 2 wherein:

the size of each of the bare and insulated wires are in the range from a number 32 wire to a number 26 wire.

4. An infrared reference source as claimed in claim 1 including:

the exterior of the wire wound body being bonded with epoxy.

5. An infrared reference source as claimed in claim 1 wherein:

the interior of the wire wound body is covered with a flat black paint.

6. An infrared reference source as claimed in claim 1 including:

means connected to terminal ends of the bare wire and responsive to the temperature within the interior of the wire wound body for controlling the temperature of the infrared reference source.

7. An infrared reference source as claimed in claim 6 wherein:

the temperature responsive means includes at least one thermistor located within the wire wound body adjacent the radiating surface so as to be capable of sensing the temperature thereof.

8. An infrared reference source comprising:

a bare conductive wire and a thinly insulated conductive wire alternately wound in engaging helical turns of progressively increasing diameter to form a hollow conical body which has an interior surface which is capable of radiating infrared;

the bare and insulated wires having substantially the same thermal conductivity so that the interior surface of the wire wound body has thermal continuity;

the size of each of the bare and insulated wires being in the range from a number 32 to a number 26 wire, said bare wire being Nichrome and the insulated wire being copper which is covered with a thin film of enamel;

the exterior of the wire wound body being bonded with epoxy to retain the wires in the conical form;

the interior of the wire wound body being covered with a flat black paint;

the wire wound body being open at its base end and substantially clear of any foreign objects within its interior so that the wires themselves constitute the infrared emitting surface;

means connected to terminal ends of the bare wire and responsive to the temperature within the interior of the wire wound body for controlling the temperature of the infrared reference source; and said temperature responsive means including at least one thermistor which is located within the wire wound body adjacent the radiating surface so as to be capable of sensing the temperature thereof.

References Cited

UNITED STATES PATENTS

| | | | |
|---|---|---|---|
| 1,859,601 | 5/1932 | Rice | 313—344 X |
| 2,852,647 | 9/1958 | Carmichael | 338—218 X |
| 2,952,762 | 9/1960 | Williams et al. | 250—85 |
| 2,963,910 | 12/1960 | Astheimer | 250—85 X |

WILLIAM F. LINDQUIST, *Primary Examiner.*